United States Patent [19]

Hurd

[11] Patent Number: 5,702,089
[45] Date of Patent: Dec. 30, 1997

[54] LIFT JACK FOR WHEELED VEHICLE

[75] Inventor: Frederick E. Hurd, Toronto, Canada

[73] Assignee: Innovation Plus Limited, Nassau, Bahamas

[21] Appl. No.: 611,572

[22] Filed: Mar. 6, 1996

[51] Int. Cl.$^6$ ............................................. B66F 7/22
[52] U.S. Cl. ............................................. 254/422; 254/94
[58] Field of Search ............................................. 254/422, 94

[56] References Cited

U.S. PATENT DOCUMENTS

| | | | |
|---|---|---|---|
| 1,682,856 | 9/1928 | Salkind | 254/422 |
| 2,143,181 | 1/1939 | Barr | 254/422 |
| 2,201,373 | 5/1940 | Miniconi | 254/422 |
| 3,733,051 | 5/1973 | Bollinger | 254/94 |
| 3,881,746 | 5/1975 | Newcomb | 254/94 |
| 5,215,289 | 6/1993 | Jacobson | 254/94 |

*Primary Examiner*—Robert C. Watson
*Attorney, Agent, or Firm*—Patrick J. Hofbauer

[57] ABSTRACT

A lift jack is provided for use with a vehicle having a structural member on the underside of the vehicle, which structural member defines a transverse rotational axis. An elongated body member defines a longitudinal axis, and has a top end portion and a bottom end portion. The longitudinal axial length of the elongated body member is greater than the height of the transverse rotational axis above the ground. The bottom end portion has a radiused lifting surface and a generally planar foot extending contiguously from the radiused lifting surface, toward a second lateral edge of the bottom end portion. The elongated body member may be rotationally mounted on the vehicle by attachment of the top end portion to the structural member. The elongated body member may in this manner be rotated about the transverse rotational axis from a stored position, through an initial deployed position, wherein the radiused lifting portion contacts the ground; and thence on to a fully deployed position, wherein the foot portion contacts the ground and the longitudinal axis of the elongated body member is substantially aligned with the true vertical direction, so as to lift the vehicle above the ground. The motive force of the vehicle is preferably used to accomplish rotation of the elongated body member from the initial deployed position to the fully deployed position.

16 Claims, 5 Drawing Sheets

LIFT JACK FOR WHEELED VEHICLE

FIELD THE INVENTION

The present invention relates to lift systems for wheeled vehicles and more particularly to lift jacks for recreational vehicles and trailers, and for automobiles and light trucks, to facilitate tire changes, repairs on, and off season storage of recreational vehicles and trailers.

BACKGROUND OF THE INVENTION

From time to time it becomes necessary to change tires or to make minor repairs to the wheels of vehicles, including recreational vehicles such as travel trailers or caravans. This operation typically requires the use of a lift jack interposed between the frame of the vehicle and the ground to lift the subject wheel clear of the ground.

Conventional jacking equipment, such as bumper jacks, or scissor jacks are designed primarily for use with automobiles, and may not function optimally for lifting a recreational vehicle. Bumper jacks are usually ineffective since the bumpers of a longer vehicle such as a travel trailer are often positioned too far away from the wheel(s) which are to be lifted off of the ground. In order to properly position a lift jack, such as a scissor jack, at a weight bearing position under the chassis of the vehicle, it may be necessary to crawl under the vehicle. This process can be inconvenient, and unless the vehicle operator is very familiar with the vehicle, or is mechanically inclined, could result in improper positioning of the jack. Consequently, it can become difficult and dangerous to operate a conventional lift jack to raise the vehicle tire(s) off of the ground for servicing. Additionally, given the significant variation in wheel size and axle height in recreational vehicles, in particular, conventional automobile jacks may not be capable of providing a lift of sufficient height to raise the wheels clear of the ground.

Further, fully functional jacking equipment may not be readily available when needed. Recreational vehicles are not ordinarily equipped with jacking devices as a standard feature. It is possible that an operator may not have sufficient space or may not remember to pack proper jacking equipment for the recreational vehicle prior to departing on a trip. If emergency roadside servicing of the recreational vehicle tires is required en route, the operator may have to resort to attempting to use an automobile lift jack, with potentially hazardous consequences, or failing that, may, if the recreational vehicle is a tow vehicle, be required to leave the recreational vehicle unattended on the roadside and drive to the nearest town or city for assistance.

Similar difficulties may also arise even in the context of automobile lift jacks. Although some sort of jacking equipment is normally provided as a standard feature of automobiles, the equipment is rarely used. It is possible that, when needed, the driver will discover that the equipment is either not in working condition or that the driver is unable to operate the jacking equipment due to lack of technical proficiency or lack of physical strength. Still more dangerous is the situation where jacking equipment is deployed improperly under the vehicle, and lifting is attempted. When used incorrectly or positioned improperly under a vehicle, the vehicle may slip off the jacking equipment, or the jacking equipment may fail, causing serious injury to the individual attempting to service the vehicle.

It is an object of the present invention to provide a lifting jack for raising a wheeled vehicle which is attachable to the vehicle in a storage position for a quick and easy deployment when required.

It is another object to provide a lift jack for raising a wheeled vehicle which does not require the operator to locate an appropriate weight bearing position on the vehicle chassis at which to safely deploy the lift jack.

It is a further object of the present invention to provide a lift jack for raising a wheeled vehicle which does not permit the vehicle to slide sideways off of the lift jack, when deployed into an operative position.

It is a further object of the present invention to provide a lift jack which will operate under the power of the vehicle once deployed into an operative position, and which does not require an operator to apply manual force to accomplish lifting of the vehicle.

It is yet a further object of the present invention to provide a lift jack which can be permanently installed on a vehicle at a position which will ensure effective operation of the lift jack when required without the need for an operator to position him/herself under or adjacent the vehicle during lifting of the vehicle by means of the lift jack.

It is yet a further object of the present invention to provide a lift jack which is readily adapted for permanent mounting to a variety of vehicles having differing wheel heights and axle sizes, either as an original equipment option, or as an after-market add-on.

SUMMARY OF THE INVENTION

In accordance with the present invention there is disclosed a lift jack for use with a wheeled vehicle having a structural member positioned on the underside of the vehicle so as to define a transverse rotational axis. The lift jack comprises an elongated body member which defines a longitudinal axis. A top end portion of the elongated body member is adjacent one end of the axis, and a bottom end portion is located adjacent the opposite other end of the longitudinal axis. The axial length of the elongated body member is greater than the height of the said rotational axis above the ground. The top end portion has a concave arcuate surface radially aligned with the longitudinal axis, wherein the arc of the concave arcuate surface defines a central axis which is coalignable with the rotational axis. The bottom end portion has a radiused lifting surface extending along a first edge thereof, displaced laterally to one side of the longitudinal axis. The origin of the radius of the radiused lifting surface is positioned on the longitudinal axis. The bottom end portion also has a generally planar foot portion intersecting and oriented substantially transverse to the longitudinal axis. The foot portion extends contiguously from the radiused lifting surface in substantially inwardly tangential relation to the radiused lifting surface, toward a second lateral edge of the bottom end portion, which second lateral edge is displaced laterally to the opposite other lateral side of the longitudinal axis. A means is attached to the top end portion of the elongated body member for mounting the elongated body member on the vehicle for sequential rotational movement of the elongated body member about the transverse rotational axis. The means for mounting the elongated body member comprises an annular split section adaptor coupling fitted around the structural member in encircling fixed relation. The split section adaptor coupling has an outer perimeter defining a circumferential bearing surface centred upon the transverse rotational axis, and dimensioned for fitment within the concave arcuate surface of the top end portion, in close-fitting frictional contact therewith, to facilitate the sequential rotational movement of the elongated body member. The sequential rotation is from a stored position, wherein the bottom end portion is lifted clear of the ground, through an initial deployed position, wherein the radiused lifting surface is in contact with the ground, to a fully deployed position wherein the foot portion is in contact with the ground and the longitudinal axis of the elongated body member is substantially aligned with the true vertical direction, so as to lift the vehicle above the ground.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF A PREFERRED EMBODIMENT

Figure 1:
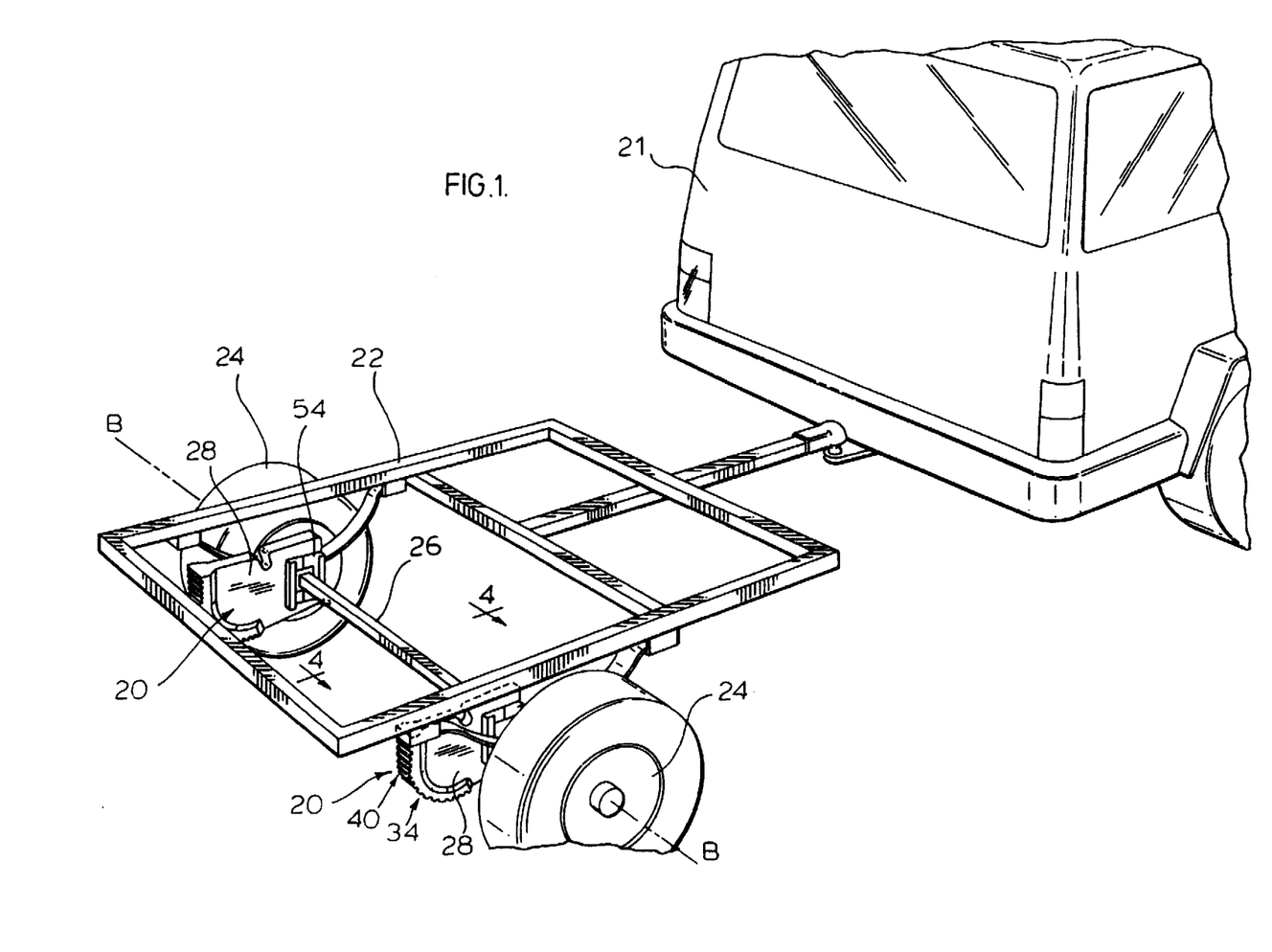
FIG. 1 of the drawings is a diagrammatic perspective view of two lift jacks according to a preferred embodiment of the invention permanently mounted to a wheeled vehicle, with each jack shown in a stored position.

Referring now to FIG. 1 of the drawings, lift jacks according to a preferred embodiment of the present invention are indicated by general reference numeral 20. A vehicle 22 is represented diagrammatically in FIG. 1 by a trailer chassis frame, in order to facilitate visualization of two of the lift jacks 20, 20 permanently mounted to the vehicle 22, adjacent each of two wheels 24, 24. The vehicle 22 of FIG. 1 is not itself motorized, but is conventionally connected for movement to a motorized van 21, which van will provide the motive power for lifting the vehicle 22 as described below.

Ordinarily, a wheeled vehicle is conceptualized as having a primarily longitudinal orientation, being from the front to the rear of the vehicle, thus the axle(s) of the vehicle are oriented in a direction transverse to the primary longitudinal orientation of the vehicle, and would define a transverse rotational axis. In FIG. 1, the axle of the trailer chassis defines such a transverse rotational axis, identified by reference letter B. The term "structural member" as used in the specification and claims hereof may be, but need not be, an axle of the vehicle. Alternatively, any structural member positioned below the underside of the vehicle in a substantially transverse relation to the longitudinal axis of the vehicle so as to define a transverse rotational axis is properly construed as a "structural member" as contemplated within the meaning of the present specification and claims. For the purposes of clarity and simplicity, the preferred embodiment of the invention will be described with all references to the transverse structural member being references, in the detailed description that follows, to an "axle".

Each of the two lift jacks 20 shown are permanently mounted to an axle 26 of the vehicle 22, which in the preferred embodiment illustrated, is constituted by the axle of the vehicle 22. Each of the two lift jacks 20 of FIG. 1 are shown in a stored position, as will be further discussed below. For simplicity, the remainder of this description will make reference to but a single one of the two lift jacks 20, 20 of FIG. 1, it being readily understood that the other of said lift jacks 20 is substantially identical in structure and function to the one described. Moreover, it will be apparent that each of two lift jacks 22 of FIG. 1 may be separately employed as described below to lift the respective adjacent wheel 24 of the vehicle 22. Similarly, in a four wheeled vehicle employing the subject invention (not shown), four lift jacks 20 my be similarly used, one each adjacent a respective one of the four wheels of the vehicle.

Figure 2:
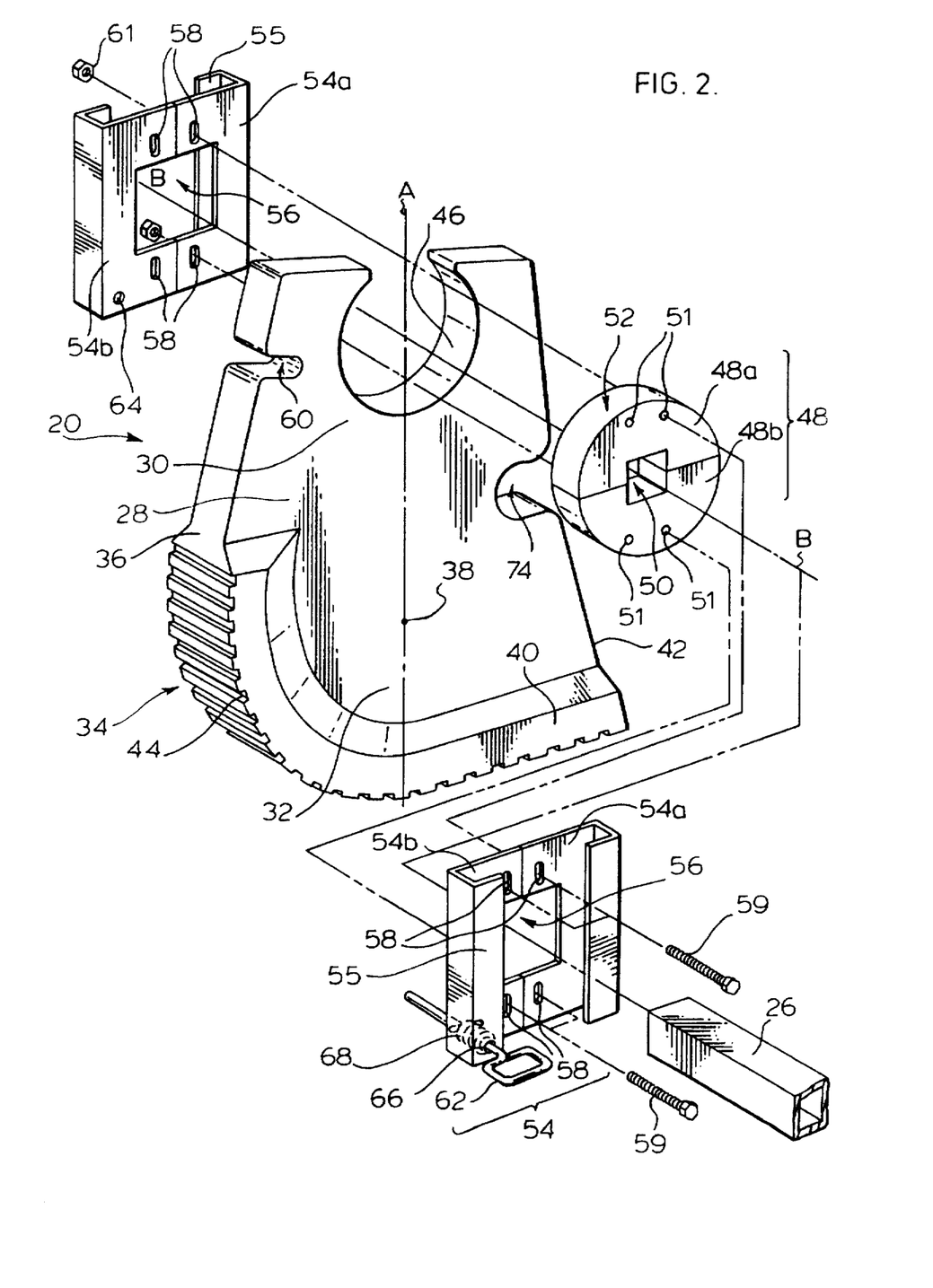
FIG. 2 of the drawings is an exploded perspective view of one of the lift jacks of FIG. 1, shown detached from the vehicle and oriented for operative weight bearing.
Figure 3:
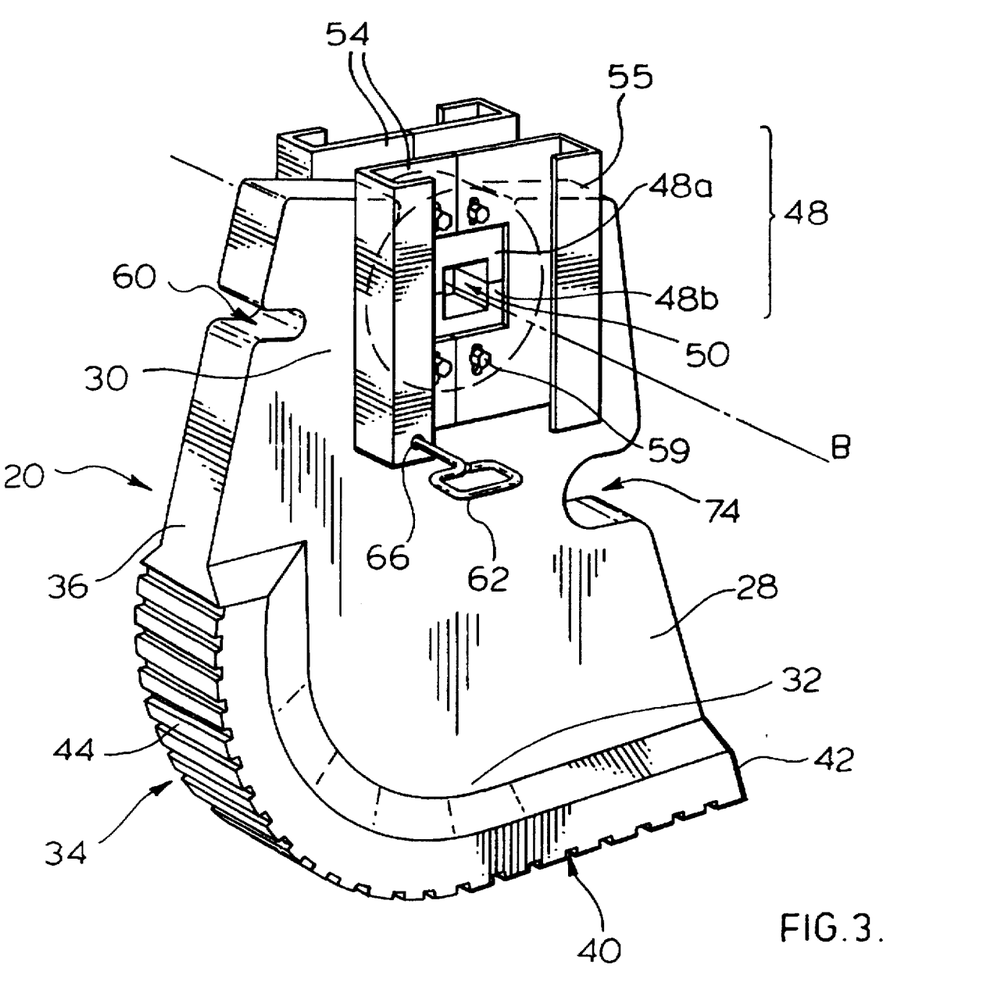
FIG. 3 is a perspective view of the lift jack of FIG. 2, with portions thereof in phantom outline.

Referring now to FIGS. 2 and 3, the lift jack 20 has an elongated body member 28 which defines a longitudinal axis identified by reference letter A in FIG. 2. The axial length of the elongated body member 28 must be greater than the height of axle 26 of the vehicle 22 above the ground in order to effectively lift the adjacent wheel 24 clear of the ground (as will be discussed further below). It has been found that the axial length of the elongated body member 28 should be approximately 2 " greater than the height of the axle above the ground. This approximately 2 " differential will allow a sufficient lift to obtain clearance of the wheel 24 (and tire) above the ground in situations where the vehicle is either loaded or unloaded. A top end portion 30 is positioned on the elongated body member 28 adjacent one end (being the top end as depicted in FIG. 2) of the longitudinal axis identified by reference letter A, and a bottom end portion 32 (being the bottom end as depicted in FIG. 2) is positioned adjacent the opposite other end of the longitudinal axis A.

The elongated body member 28 is preferably a unitary structure constructed from a material which is lightweight and which has a high compressive strength. A number of plastics materials have suitable characteristics, and in particular, the preferred construction material is low density polyethylene (LDPE). Rotational molding of the LDPE is preferably used to create the elongated body member 28, resulting in a product which is formed to meet relatively stringent manufacturing tolerances, which displays satisfactory compressive strength to permit vehicle lifting, and yet has sufficient resiliency to allow for surface friction to permit lift. Moreover, with LDPE, the elongated body member 28 remains light enough for permanent installation of a lift jack 20 adjacent each wheel of a wheeled vehicle without the sacrifice of vehicle efficiency.

The top end portion 30 is adapted for weight bearing pivotal contact with the axle 26 of the vehicle 22. The top end portion 30 has a concave arcuate surface 46 which is radially aligned with the longitudinal axis. The arc of the concave arcuate surface defines a central axis which is coalignable with the transverse rotational axis B, as best seen in FIG. 2.

The elongated body portion 28 also has a bottom end portion 32 adapted for lift-supporting contact with the ground. The bottom end portion 32 has a radiused lifting surface 34 extending along a first lateral edge 36 of the bottom end portion 32. The radiused lifting surface 34 is displaced laterally to one side of the longitudinal axis A, and the point of origin of the radius of the radiused lifting surface 34 is positioned upon the longitudinal axis A. This point is indicated by reference numeral 38 in FIG. 2. A generally planar foot portion 40 of the bottom end portion 32 intersects the longitudinal axis A, and is oriented substantially transversely thereto. The foot portion 40 extends contiguously from the radiused lifting surface 34 in a substantially inwardly tangential relation thereto and extends toward a second lateral edge 42 of the bottom end portion 32. The second lateral edge 42 of the bottom end portion 32 is displaced laterally to the opposite other lateral side of the longitudinal axis A. The radiused lifting surface 34 and the foot portion 40 are contoured for frictional contact with the ground by means of a continuous tread pattern 44 extending thereover. The bottom end portion 32 is preferentially adapted for its lift supporting function by being of a wider cross section than the remainder of the elongated body portion 28, including the top end portion 30.

The lift jack 20 is mounted to the vehicle 22 by a means attached to the top end portion 30 for rotatably mounting the elongated body member 28 on the vehicle. This means for mounting the elongated body member 28 is preferably an annular split section adaptor coupling 48 comprised of two substantially identical mirror image sections 48a and 48b fitted around the axle 26 in adjustably tight encircling fixed relation. The two sections 48a and 48b together define a central opening 50 through the coupling 48, which opening is coalignable with the transverse rotational axis B, and which central opening 50 is dimensioned to accommodate the axle 26 in clamped throughpassing relation. The clamping action should be sufficiently tight around the axle 26 so as to prevent the split section adaptor coupling 48 from sliding along the axle 26 when the entire assembly is completed in the manner described below. The annular split section adaptor coupling 48 has an outer perimeter defining a circumferential bearing surface 52, (best seen in FIG. 2) which bearing surface 52 is centred upon the transverse rotational axis B. The circumferential bearing surface 52 is dimensioned for fitment within the concave arcuate surface 46 of the top portion 30 in close, slip-fitting frictional contact therewith. Thus, the elongated body member 28 is rotatably mounted to the axle 26, and depends therefrom through the interaction of the circumferential bearing surface 52 of the annular split section adaptor coupling 48 with the arcuate surface 46 of top end portion 30 of the elongated body member 28. This indirect mounting permits the concave arcuate surface 46 to move relative to the annular split section adaptor coupling 48 in order to facilitate sequential rotation of the elongated body member 28 around the transverse rotational axis B, as will be discussed further below. The annular split section adaptor coupling 48 can be manufactured from any suitable material, including metals; however, plastic materials, including ABS plastic, or high density polyethylene, have acceptable utility, reduce costs, and ensure that the entire lift jack remains as lightweight as possible.

The lift jack 20 is additionally provided with two connecting brackets 54, 54, as best seen in FIG. 2, to further stabilize the mounting retention of the elongated body member 28 on the axle 26. Such stabilization includes preventing sideways movement or slippage of the elongated body member 28 along the axle 26 during the operative lifting of a wheeled vehicle. Each connecting bracket 54 is comprised of two mirror imaged half-brackets 54a, 54b which abut one another along a vertically oriented plane. Each connecting bracket 54 is substantially planar, but has a flange 55 directed axially outwardly along the transverse rotational axis B. Each set of two half-brackets 54a, 54b together define a central opening 56 through the connecting bracket 54, which opening 56 is coaxial with the transverse rotational axis B, and is dimensioned to accommodate the axle 26 in throughpassing relation. The connecting brackets 54, 54 are installed on the axle 26 on opposite axial sides of the annular split section adaptor coupling 48 as shown in the drawings, and the connecting brackets 54, 54 are rigidly connected one to the other as follows. Each of the connecting half-brackets 54a and 54b has a vertically oriented pair of secondary openings 58 therethrough, which openings 58 are centred about transverse axes parallel to the transverse rotational axis B. The openings 58 are preferably vertically elongated to facilitate the adjustable attachment of the connecting brackets 54, 54 to one another by permitting the passage therethrough of the equal plurality of screw threaded fasteners. In FIGS. 2 and 3, the screw threaded fasteners comprise bolts 59 and correspondingly threaded nuts 61. The annular split section adaptor coupling 48 is also provided with an equal plurality of secondary openings 51 therethrough, centred about transverse axes parallel to the transverse rotational axis B. The equal plurality of secondary openings 51 are grouped in horizontally oriented pairs, one pair positioned through each of the sections 48a and 54b, such that the secondary openings 51 of the annular split section adaptor coupling 48 are in register with the secondary openings 58 through the connecting brackets 54, 54. The secondary openings 51 also permit passage therethrough of the equal plurality of screw threaded fasteners (bolts 59 and nuts 61 in FIG. 2). Thus, the annular split section adaptor coupling 48 is connected in secured, engaged relation to the connecting brackets 54, 54, while the elongated body member 28, which depends from the annular split section adaptor coupling 48, is prevented from lateral movement along the axle 26, by the physical interference of one of the connecting brackets 54 on either axial side thereof. The horizontal grouping of the secondary openings 51 on each of sections 48a and 48b complements the vertical grouping of the secondary openings 58 on each of the half-brackets 54a and 54b, so as to prevent the separation of the connecting brackets 54, 54 and the annular split section adaptor coupling 48 into their respective components, when the bolts 59 are engaged between the brackets 54, 54 and secured by the nuts 61. The vertical elongation of the secondary openings 58 allow for adjustable clamping of the annular split section adaptor coupling 48 about the axle 26.

Figure 4:
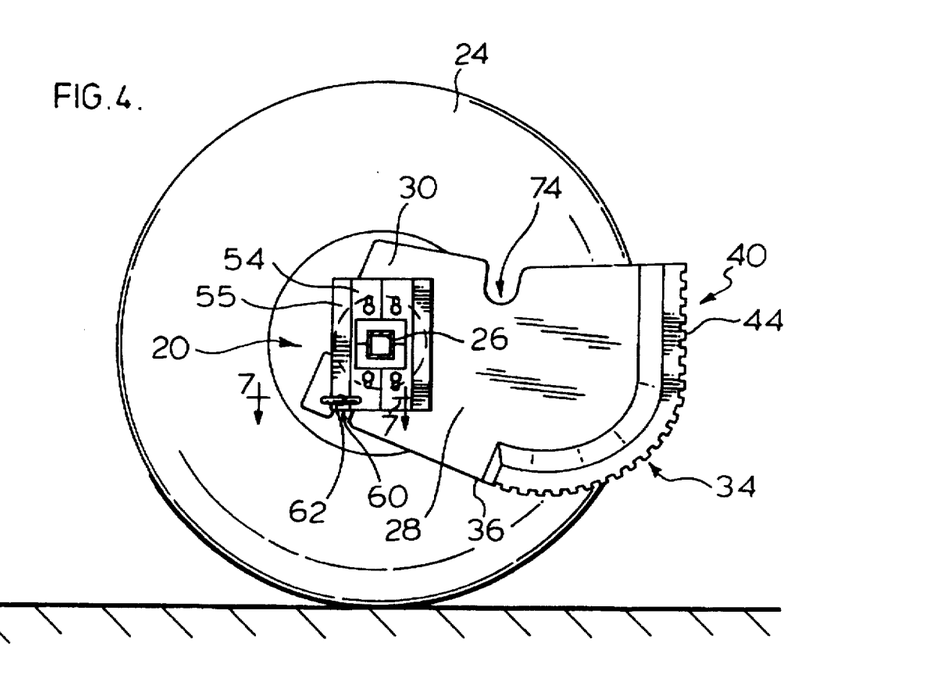
FIG. 4 is a sectional view of along sight line 4—4 of FIG. 1 with the lift jack shown in the stored position.
Figure 5:
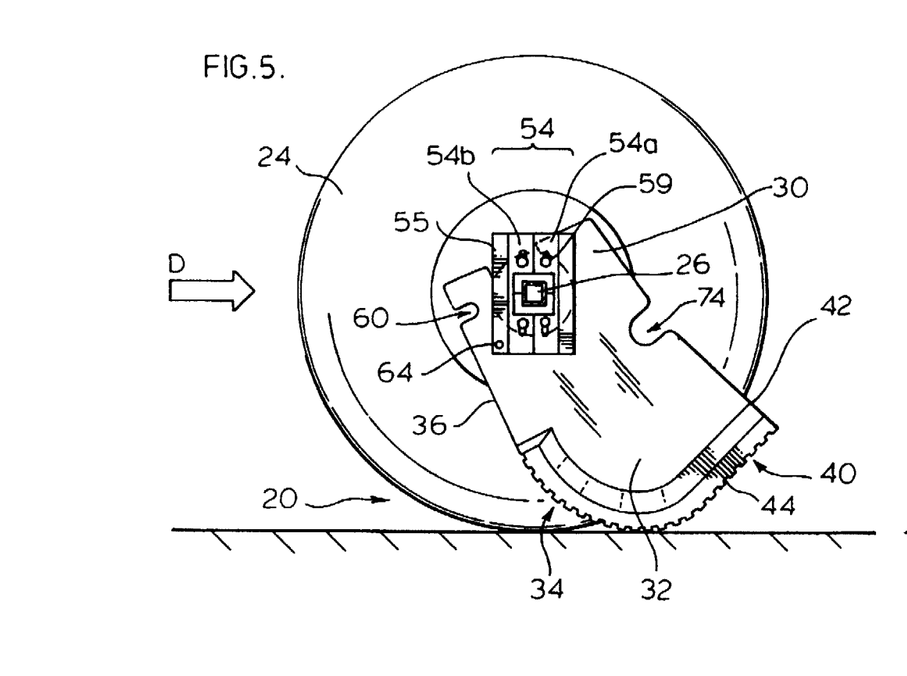
FIG. 5 is a view similar to FIG. 4, with the lift jack shown in an initial deployed position in operative contact with the ground.
Figure 7:
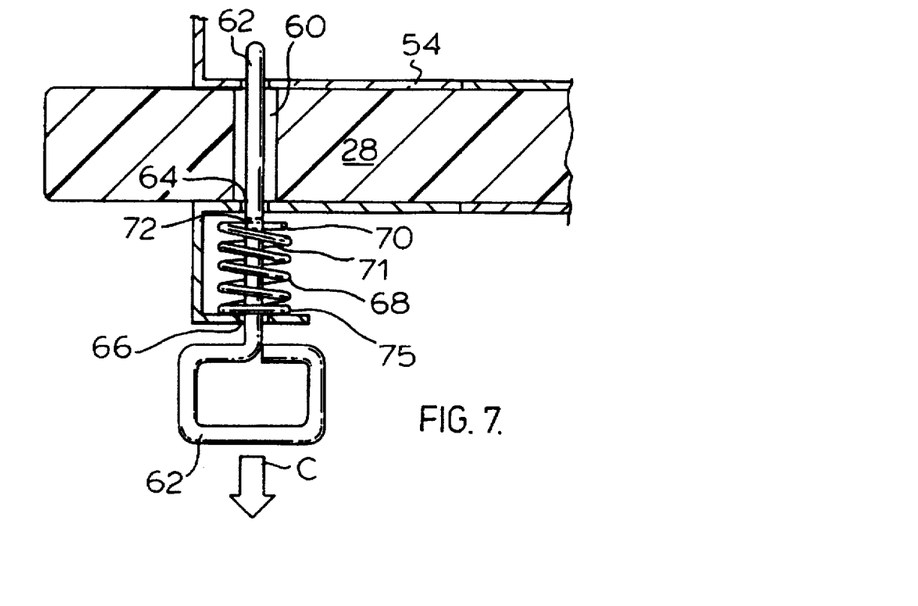

The lift jack 20 has a blocking means as described below for selectively engaging the elongated body member 28 so as to hold the elongated body member 28 in a stored position above the ground when the lift jack 20 is not in use. Without such a blocking means, the elongated body member 28 would, under the influence of gravity, rest lightly against the ground, as seen in FIG. 5. This is the initial deployed position is required to commence the lifting process, as discussed below, but would be unacceptable during regular operation of the vehicle. Instead, it is desirable that when the lift jack 20 when not in use, it be retained in a stored position (as seen in FIGS. 1 and 4), in which the radiused lifting surface 34 and the foot portion 40 are held in raised relation out of contact with the ground. In the preferred embodiment illustrated, the blocking means takes the form of a pin member 62, which pin member 62 is selectively mounted in transverse slidable connecting relation between the connecting brackets 54. In the stored position, the pin member 62 engages the elongated body member 28 by contact with an edge slot 60, thereby to block the rotation of the elongated body member 28 from the stored position shown in FIGS. 1 and 4 to the initial deployed position of FIG. 5. As shown in FIGS. 2 and 7, the connecting brackets 54, 54 each have a first pin member guide hole 64 to receive the pin member 62. The flange 55 of each connecting bracket 54 additionally has a second pin member guide hole 66 in register with the first pin member guide hole 64 in the respective connecting bracket 54. The mounting of the pin member 62 in transverse slidable connecting relation between the connecting brackets 54, 54, as aforesaid, is accomplished by the insertion of the pin member 62 through, respectively, the second pin member guide hole 66 of the flange 55 of a selected one of the connecting brackets 54, the first pin member guide hole 64 of the corresponding selected connecting bracket 54, the edge slot 60 of the elongated body member 28, and the first pin member guide hole 64 of the other connecting bracket 54. The pin member 62 is slidable between a latched configuration wherein the pin member 62 is maintained in this transverse slidable connecting relation between the connecting brackets 54, 54, and an unlatched configuration wherein the pin member 62 is displaced out of such relation. A biasing means, such as a coil compression spring 68, is preferably employed to bias the pin member toward the latched configuration, as best seen in FIG. 7. The coil compression spring 68 has a body portion 71 which surrounds the pin member 62, and has opposed free end faces which are operatively retained between a selected one of the connecting brackets 54 and the corresponding flange 55 thereof. The coil compression spring 68 has two end tangs 70, 75, one 75 of which is retained against the connecting flange 54, and the other 70 of which passes through a transverse slot 72 drilled in the pin member 62. Thus, the coil compression spring 68 biases the pin member 62 toward the latched configuration until a force is applied in the direction of arrow C of FIG. 7 to counteract the biasing action of the coil compression spring 68.

Figure 6:
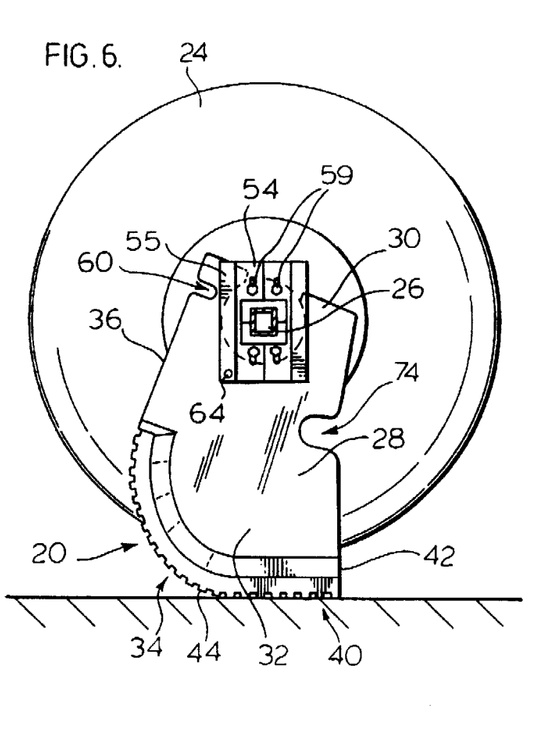
FIG. 6 is a view similar to FIG. 5, with the lift jack shown in a fully deployed position wherein lifting of the vehicle has been completed; and, FIG. 7 of thugs is a partial cross-sectional view along sight line 7—7 of FIG. 4.

FIGS. 4, 5, and 6 illustrate the sequence of steps necessary to accomplish the raising of the wheel 24 of the vehicle 22. In FIG. 4, the elongated body member 28 is shown in the stored position. It must first be released to its initial deployed position (see FIG. 5) in contact with the ground. In order to release the elongated body member 28 from the stored position, a pulling force is applied to the pin member 62 in the direction shown by arrow C in FIG. 7, so as to overcome the biasing force and remove the pin member 62 from the latched configuration. This action allows the elongated body member 28 to drop to the initial deployed position as shown in FIG. 5. When the pulling force is released, the coil compression spring 68 will urge the pin member 62 back toward the latched configuration, but when the elongated body member 28 has been rotated to the initial deployed position, the edge slot 60 will no longer be in register with the pin member passages 64, 66. Consequently, the pin member 62 will slidably abut the elongated body member 28, but will be unable to slide into the latched configuration.

The van operator then reverses the van 21 to begin movement of the vehicle 22 in a direction toward the second lateral edge 42 of the elongated body member 28, (ie. in the direction indicated by arrow D of FIG. 5). The radiused lifting surface 34 of the elongated body member 28 is in the initial deployed position in contact with the ground with the tread pattern 44 on the radiused lifting surface 34 frictionally engaging the ground. The radiused lifting surface 34 will begin to rotate relative to the ground in response to said motion of the vehicle 22 and said frictional engagement, causing the concave arcuate surface 46 of the elongated body member 28 to rotate against the circumferential bearing surface 52 of the annular split section adaptor coupling 48. Continued rotation of the radiused lifting surface 34 causes an increasing upward lifting force to be applied to the axle 26, since the axial length of the elongated body member 28 is greater than the height of the axle 26 above the ground. The result of the continued application of such force is a progressive lifting of the axle 26, with the concurrent lifting of the adjacent wheel 24 attached thereto. As movement of the vehicle 22 in the direction of arrow D continues, the elongated body member 28 will complete the rotational path dictated by the radiused lifting surface 34, at which time the relatively flat foot portion 40 of the elongated body member 28 will abruptly encounter the ground, as seen in FIG. 6. The distance between the foot portion 40 and the top end portion 30 is greatest along the longitudinal axis A of the elongated body member 28, and when the foot portion 40 is in horizontal resting contact upon the ground in the fully deployed position of FIG. 6, the axle 26 of the vehicle 22 will rest indirectly upon the elongated body member 28, resulting in an increased height above the ground of approximately 1.5 to 2 inches. The adjacent attached wheel 24 is, thus, maintained out of contact with the ground. The fully deployed position, wherein the foot portion 40 contacts the ground, is a position of stability for the elongated body member 28, since in this position the longitudinal axis A of the elongated body member 28 is substantially aligned with the true vertical direction. As the elongated body member 28 achieves the fully deployed position, it tends to do so somewhat abruptly, as the bottom end portion 32 is contoured such that the foot portion 40 extends in an inwardly tangential relation to the curvature of the radiused lifting surface 34. A "thumping" sensation noticeable to the operator of the van 21 occurs upon contact of the foot portion 40 with the ground. This is especially noticeable if both lift jacks 20, as seen in FIG. 1, are simultaneously deployed. The operator can rely upon the occurrence of this thumping as an indication that the vehicle has reached a stable elevated position upon the lift jack 20. Moreover, the stability of this position will resist further motion in the direction of arrow D, in certain instances almost to the point of stalling the engine of the van 21. Given the "thumping" phenomenon, and the resistance of the lift jack 20 to further movement, the lift jack 20 of the present invention can be operated by a single individual without the need for someone to signal to the operator when lifting has been completed; however, such an additional "spotter" is advisable for safety reasons.

In order to release the lift jack 20 and lower the vehicle 22 from the said position shown in FIG. 6, the operator would simply pull the vehicle 22 forward (ie. in a direction opposite to that of arrow D of FIG. 5), causing the radiused lifting surface 34 of the elongated body member 28 to rotate in the opposite direction. The engagement of the foot portion 40 with the ground is thus gradually released, and as the elongated body portion 28 completes its forward rotational movement along the path dictated by the radiused lifting surface 34, the vehicle is lowered. Once the vehicle 22 has been safely lowered, and the elongated body member 28 has returned to its initial deployed position (shown in FIG. 5), the elongated body member may then be manually returned to its stored position (shown in FIG. 4). To position the elongated body member 28 for storage, the elongated body member 28 is rotated manually to the stored position by the operator. At this stored position, the edge slot 60 is again in register with the first 64 and second 66 pin member guide holes. Such registration allows the biasing force of the coil compression spring 68 to again urge the pin member 62 into the latched configuration previously described, thereby to hold the elongated body member in the stored position of FIG. 4. The elongated body member 28 is preferably provided with a groove 74 adjacent the second lateral edge 42, which groove 74 is adapted to accommodate the passage of vehicle brake cables (not shown), such that the elongated body member 28 will not press upon the brake cables of the vehicle 22 when the elongated body member 28 is secured in its stored position.

For ease of installation, each connecting bracket 54 can, as illustrated in the appended Figures, be constructed as two substantially identical half-brackets 54a and 54b, which half-brackets are positioned at opposed sides of said axle 26, and then attached together, such that the axle 26 is retained within the central opening 56 defined by each connecting bracket 54. The connecting brackets 54 are preferably manufactured to a standard size, with the central opening 56 of a uniform size and shape sufficiently large to accommodate passage therethrough of a wide variety of vehicle axles 26. With this arrangement, in order to adapt the lift jack 20 to fit a particular vehicle, only the annular split section adaptor coupling 48, and in particular the central opening 50 therethrough, need be manufactured to particular, a specifications for that vehicle. Thus, a variety of annular split section adaptor couplings 48 having central openings in a range of standard sizes and shapes could economically be manufactured from which to select a particular annular split section adaptor coupling 48 having the necessary specifications to fit around the axle 26 of a given make and model of vehicle 22. Accordingly, the lift jack 20 of the present invention may be efficiently manufactured for sale as an after-market add-on product which is readily adaptable for permanent mounting to a wide range of vehicles, including recreational vehicles, automobiles, and light trucks.

The order of assembly on the vehicle 22 of the component parts of the lift jack 20 for installation in an after-market context would be as follows. The two mirror-image sections 48a and 48b of the annular split adaptor coupling 48 would be positioned around the axle 26 and manually held in place in encircling fixed relation. The elongated body member 28 would then be positioned with the concave arcuate surface 46 of the top end portion 30 encircling the axle 26. The elongated body member is then moved laterally toward the annular split adaptor coupling 48 so as to bring the concave arcuate surface 46 of top portion 30 into aligned, slip-fitting frictional contact with the circumferential bearing surface 52 of the annular split adaptor coupling 48, thus securing the sections 48a and 48b together, and simultaneously indirectly mounting elongated body portion 28 on the axle 26. The half-brackets 54a and 54b of each connecting bracket 54 are then positioned to define a central opening 56 therethrough coaxial with the axle 26, with one connecting bracket 54 on each axial side of the annular split section adaptor coupling 48 as shown in the Figures. The connecting brackets 54, 54 are then rigidly attached one to the other by the through-passage of the screw threaded bolts 59 through the secondary openings 58 in each connecting bracket and the secondary openings 51 in the coupling 48. Correspondingly threaded nuts 61 are then attached and tightened on each of the bolts 59 to secure the assembly.

In the preferred embodiment described and illustrated above, the lift jack 20 of the present invention is optimally designed as an after-market add on for use with most vehicles. It will be obvious to those skilled in the art that the invention could be installed as original equipment on recreational or other vehicles wherein the annular split section adaptor coupling 48 would advantageously be fabricated as a single component welded directly to the axle 26. Similarly, for installations by Original Equipment Manufacturers (OEM), each of the connecting brackets 54 could be manufactured to dimensions customized for installation on a particular vehicle. Moreover, the connecting brackets could each be manufactured as a unitary structure, rather than in the form of two half-brackets as shown in the Figures. Connecting brackets having such a unitary structure would have to be installed on the axle sequentially, before mounting of the brake backing plates etc., with one connecting bracket fitted to the axle, then the annular split section adaptor coupling mounted and welded to the axle, then the elongated body member slid over the split section adaptor coupling, and finally the remaining connecting bracket would be installed and the assembly bolted together as aforesaid.

Further, modifications can routinely be made to the means for attaching the connecting brackets to one another in order to enhance cost efficiency. Similarly, other mechanisms for retaining the elongated body member in the stored position can readily be substituted for the preferred method described above, or a cable release mechanism can be advantageously added to eliminate the need for the operator to reach under the vehicle to pull the pin member 62.

Although the lift jack of the present invention has been illustrated and described with reference to use on a recreational trailer, it can easily and routinely be adapted for use on other vehicles, including passenger automobiles, with similar utility. Moreover, the "structural member" in such applications need not be a wheel axle of the vehicle, but may be provided on the underside of the vehicle for the specific purpose of mounting one or more lift jacks according to the present invention thereon. This is thought particularly appropriate where the lift jacks are to be mounted on a passenger vehicle adjacent front wheels of the vehicle.

It may also be possible to employ only one connecting bracket, or a similar structure, to prevent lateral movement of the elongated body member visa vis the annular split section adaptor coupling along the axle. Moreover, if additional clamping force on the vehicle axle is required to prevent the lift jack from sliding along the axle in any particular application, the central opening through the half-brackets may be reduced to be slightly smaller than the outside dimension of the axle, so that additional clamping force will be asserted by the half-brackets on the axle. To further assist in the provision of such auxiliary clamping, cross-bolts (not shown) can be used to transversely connect the flanges of respective half-brackets to each other, one above, and one below (and both transverse to) the axle. Thus, it will be apparent that the scope of the present invention is limited only by the claims set out hereinbelow.

I claim:

1. A lift jack for use with a vehicle having a structural member positioned on the underside of the vehicle so as to define a transverse rotational axis, said lift jack comprising:

an elongated body member having a longitudinal axis, a top end portion adjacent one end of said longitudinal axis, said top end portion having a concave arcuate surface radially aligned with said longitudinal axis and wherein the arc of said concave arcuate surface defines a central axis coalignable with said rotational axis, and a bottom end portion adjacent the opposite other end of said longitudinal axis, the longitudinal axial length of said elongated body member being greater than the height of said transverse rotational axis above the ground;

said bottom end portion having a radiused lifting surface extending along a first lateral edge of said bottom end portion displaced laterally to one side of said longitudinal axis, the origin of the radius of said radiused lifting surface being positioned on said longitudinal axis, said bottom end portion also having a generally planar foot portion intersecting and oriented substantially transverse to said longitudinal axis and extending contiguously from said radiused lifting surface, in substantially inwardly, tangential relation to said radiused lifting surface toward a second lateral edge of said bottom end portion displaced laterally to the opposite other lateral side of said longitudinal axis; and, means attached to said top end portion for mounting the elongated body member on the vehicle, said means comprising an annular split section adaptor coupling fitted around said structural member in encircling fixed relation, said split section adaptor coupling having an outer perimeter defining a circumferential bearing surface centred upon said transverse rotational axis, said circumferential bearing surface being dimensioned for fitment within said concave arcuate surface of said top end portion in close-fitting frictional contact therewith to facilitate sequential rotational movement of said elongated body portion around said transverse rotational axis from a stored position wherein the bottom end portion is lifted clear of the ground, through an initial deployed position wherein the radiused lifting surface is in contact with the ground, to a fully deployed position wherein said foot portion is in contact with the ground and the longitudinal axis of the elongated body member is substantially aligned with the true vertical direction, so as to lift the vehicle above the ground.

2. The lift jack of claim 1, wherein said annular split section adaptor coupling has a central opening coalignable with said transverse rotational axis, and dimensioned to accommodate said structural member in clamped, throughpassing relation.

3. The lift jack of claim 2, further comprising two substantially planar connecting brackets each having a central opening, coaxial with said transverse rotational axis and dimensioned to accommodate in throughpassing relation the structural member, said connecting brackets being rigidly connected together, one each on opposite axial sides of said annular split section adaptor coupling.

4. The lift jack of claim 3, wherein, each of said connecting brackets has a plurality of secondary openings therethrough, each one of said plurality of secondary openings being centred about respective transverse axes parallel to said transverse rotational axis;

said annular split section adaptor coupling having an equal plurality of secondary openings therethrough, each of said plurality of secondary openings being centred about one of said respective transverse axes parallel to said transverse rotational axis; and, wherein said plurality of secondary openings of each of said connecting brackets and said equal plurality of secondary openings of said annular split section adaptor coupling are positioned one each in register with one another to accommodate the passage therethrough of an equal plurality of threaded fasteners in secured, engaged relation with said connecting brackets and said annular split section adaptor coupling.

5. The lift jack of claim 4, further comprising blocking means for selectively holding said elongated body member in a stored position in which said radiused lifting surface and said foot portion are held in raised relation out of contact with the ground.

6. The lift jack of claim 5, wherein said blocking means comprises a pin member selectively mounted in transverse slidable connecting relation between said connecting brackets so as to selectively engage said elongated body member in said stored position so as to block the rotation of said elongated body member from said stored position to said initial deployed position, and additionally comprising a biasing means interconnected between one of said connecting brackets and said pin member so as to bias the pin member toward said transverse slidable connecting relation.

7. The lift jack of claim 6, wherein said pin member has a transverse slot therethrough, and said biasing means comprises a coil compression spring having a body portion surrounding the pin member and having opposed free end faces being operatively retained between a selected one of said connection brackets and a respective axially outwardly directed flange thereof, said coil compression spring having one of its two end tangs passing through said transverse slot, so as to bias said pin member toward the latched configuration as aforesaid.

8. The lift jack of claim 1, wherein said radiused lifting surface and said foot portion are contoured for frictional contact with the ground.

9. The lift jack of claim 8, wherein said frictional contouring consists of a continuous tread pattern extending over the radiused lifting surface and the foot portion.

10. The lift jack of claim 1, wherein said elongated body member is constructed from a light weight material of high compressive strength.

11. The lift jack of claim 10, wherein said elongated body member is constructed from a plastics material.

12. The lift jack of claim 11, wherein said elongated body member is constructed from low density polyethylene.

13. The lift jack of claim 12, wherein said elongated body member is substantially hollow.

14. The lift jack of claim 13, wherein said elongated body member is constructed by rotational molding.

15. The lift jack of claim 14, wherein said bottom end portion of the elongated body member is wider in cross section than the top end portion of the elongated body member.

16. The lift jack of claim 15, wherein said elongated body member has a groove thereon adjacent said opposite other lateral side of said longitudinal axis to facilitate the passage therethrough of a brake cable of the wheeled vehicle while the elongated body member is in a stored position.

* * * * *